June 22, 1965  M. ISAACMAN  3,190,335
TRACTION DEVICE FOR VEHICLE WHEELS
Filed Nov. 22, 1963
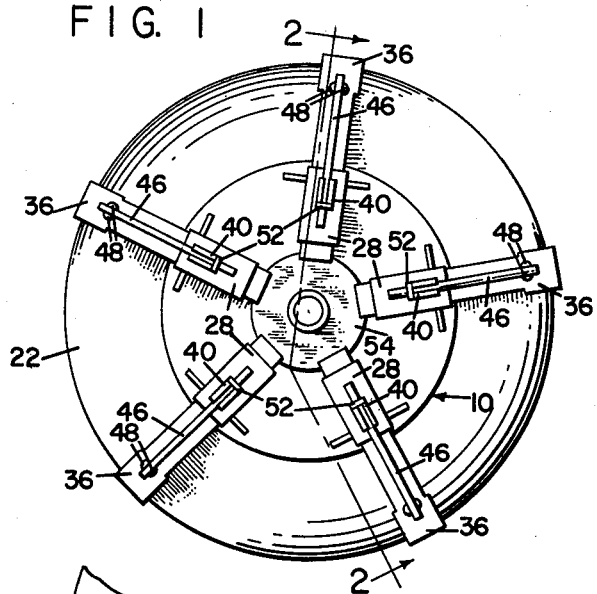
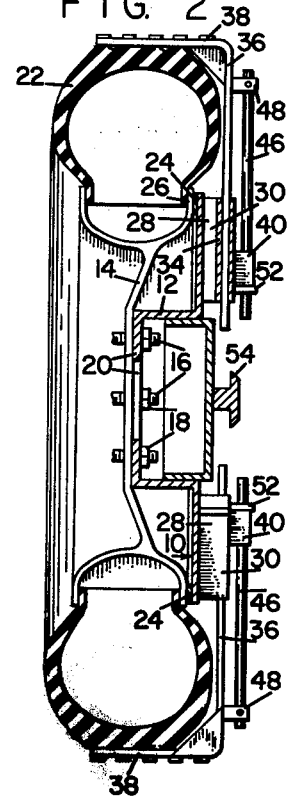
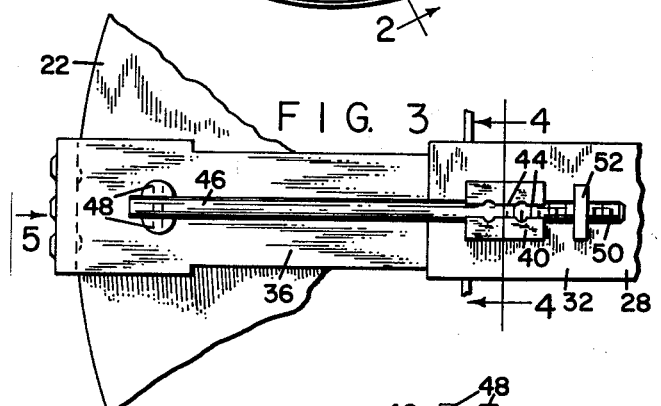
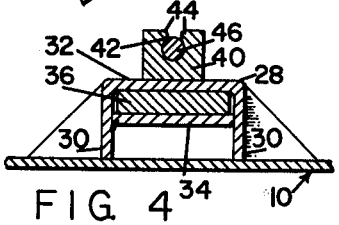
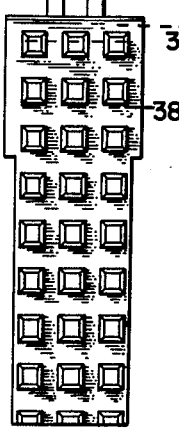
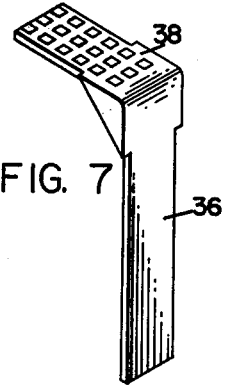
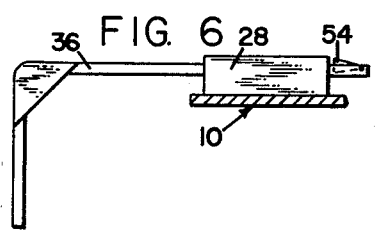
INVENTOR
MORRIS ISAACMAN
BY *Charles R. Fay*,
ATTORNEY

United States Patent Office 3,190,335
Patented June 22, 1965

3,190,335
TRACTION DEVICE FOR VEHICLE WHEELS
Morris Isaacman, 185 S. Flagg St., Worcester, Mass.
Filed Nov. 22, 1963, Ser. No. 325,655
3 Claims. (Cl. 152—216)

It has long been a problem to provide adequate traction means for vehicle wheels for safe driving in ice, snow and mud. The well known tire chain has been used for many years and sometimes is sufficient and adequate for the purpose, but such chains are very difficult to place on the tires and for this reason they are often not used when they should be. The well known and so-called "snow tire" is often inadequate.

It is the general purpose of the present invention to provide a traction device for vehicle wheels which is not only adequate to all conditions of travel, but which is also simple, quick and easy to apply and also to remove when not needed.

A further object of the invention resides in the provision of a disc-like member which is adapted to be attached to a vehicle wheel by the same lugs which attach the wheel to the hub or axle of the vehicle, and including a series of radially extending fixed holder mmebers wherein the disc and the holder members do not project beyond the rim, in combination with a series of traction members which are detachably disposed in the holder members and extend radially outwardly beyond the disc and the tire to rest on and across the tread, together with means for holding said traction members in position and across the tread of the tire while still allowing the same to become retracted as the traction members across the treads strike the ground, whereby the traction members can be utilized when needed by merely applying them to the holders therefor and can as easily be removed when not required.

Other objects and advantages of the invention will appear hereinafter.

Reference is to be had to the accompanying drawings, in which

FIG. 1 is a view in front elevation showing the invention;

FIG. 2 is a section on line 2—2 of FIG. 1 on an enlarged scale;

FIG. 3 is an enlarged view in elevation illustrating the connection between a traction device and the holder therefor;

FIG. 4 is a section on line 4—4 of FIG. 3;

FIG. 5 is a plan view, looking in the direction of arrow 5 in FIG. 3;

FIG. 6 is a detail view showing a safety device, and

FIG. 7 is a perspective view illustrating the general construction of the traction cleats.

In carrying out the present invention there is provided a relatively large strong disc generally indicated by the reference numeral 10 and this disc is provided with an indented hub 12 which fits the vehicle wheel generally indicated at 14 and is held thereto in fixed position by means of the ordinary lugs 16 and nuts 18 found on the usual axle or axle hub of a vehicle. The bottom wall 20 of the hub 12 is idented in proper form to fit the usual vehicle wheel and the apertures through which the lugs 16 extend are properly countersunk and formed to fit the wheels to which the device 10 is adapted to be mounted. In FIG. 1 the tire is shown at 22 merely in outline as this tire is of course completely conventional. Also the disc 10 may be completely dipped in plastic or rubber material or it may be provided with an annular anti-vibration and anti-noise ring of suitable material as is indicated by the reference numeral 24, and in any event it is adapted to be held in close association with the rim 26 of the wheel 14 by the lugs 16 and nuts 18.

Arranged on the outer face of the disc 10 are a series of radially arranged holding devices 28. Each one of these holding devices is generally rectangular in section (see FIG. 4) and includes side walls 30, 30, top wall 32, and an intermediate spacer member 34. Spacer member 34 and top wall 32 provide a sliding holding arrangement for an elongated member 36, each of which is provided with a right-angled traction element 38, 38 adapted to overlie the tread of the tire 22 (see FIG. 2). The traction member 38 is provided with irregular raised protuberances on both sides thereof, those underneath engaging the tread of the tire to help hold the device in position, and those at the exterior engaging the ground to provide extra traction. It is to be emphasized that these traction devices 36, 38 are quickly and easily removable with respect to the holding devices 28 by sliding them out radially.

The holding devices 28 are each provided with a holding block generally indicated at 40 and this has in its upper surface an indentation 42 which is undercut, leaving extending protuberances 44 overhanging the undercut to receive a rod 46. Any kind of holder for rod 46 can also be used, such as spring detents, spring latches, etc., all as well known in the art. The rod 46 can be forced into the undercut recess 42 but it cannot accidentally work loose although it can be easily again forced out. Block 40 can be steel, rubber, plastic, etc.

The rod 46 is pivotally mounted on each member 36 by means of a pair of blocks 48 to which the respective rods 46 are pinned, and each rod 46 is screw-threaded at its end as at 50 (see FIG. 3) and has thereon a wing-nut or the like 52 so that when the traction element 38 contacts the tread of the tire 22 and the rod 46 is snapped into its block 40, the nut 52 can be brought up into engagement with the lower end of block 40, thus positioning the rod 46 and the member 36 against the tread of the tire and holding it from any outward motion due to centrifugal force. At the same time, however, the rod 46 can move to the right in FIG. 3 as for instance when the traction element 38 strikes the ground and the tire becomes indented, so that the traction members are firmly secured to the wheel but are movable inwardly with respect thereto but not outwardly. Also, a rubber washer or bumper, or a spring if desired, can be placed on the rod and interposed between the nut 52 and block 40 if found desirable.

Other means may of course be utilized for performing the function of the rods 46 such as for instance adjustable strap members or other adjustable means, but it has been found that the particular construction described allows for the members 36 to be inserted in their holders 28 and quickly and easily secured thereto in the manner described above for radial inward sliding motion, but at the same time being held against any relative outward motion and also being held against dislodgment from the blocks 40. Any kind of locking arrangement desired may be utilized to hold the nuts 52 in position or elastic stop nuts, etc., may also be used.

The indented hub 12 may be ornamentally closed as for instance by any kind of cover 54 which can be held in position frictionally.

It will be seen that this invention provides a relatively simple, practical and efficient traction device for vehicle wheels in which the disc alone may be applied to the wheels of the vehicle at the beinning of the snow and ice season and removed in the spring. The vehicle is used as usual. The traction devices 36 and 38 are of course not used at all until necessary, and then they are quickly and easily applied and as quickly and easily removed. The periphery of the disc 10 extends approximately coextensively with the rim of the wheel, and at no time will the disc contact the ground even in case of a flat tire. At the same time, however, the traction devices, when in position as in FIGS. 1 and 2, have a considerable inward motion provided in case of need although they are firmly held against any outward motion.

As shown in FIG. 6 the member 36 may be provided with a spring-actuated dog 54 so that when it is thrust through the passage comprising the members 32, 34, the dog 54 normally clicks up behind the member for instance 28 in FIG. 6 and prevents accidental dislodgment of the cleat member through centrifugal force. At the same time however the dog 54 is manually depressable in order to release the cleat so that it can be removed.

Having thus described my invention and the advantages thereof, I do not wish to be limited to the details herein disclosed, otherwise than as set forth in the claims, but what I claim is:

1. A traction device for vehicle wheels comprising the combination with a wheel for a vehicle having a pneumatic tire on the rim thereof, of a disc adapted to be secured to the wheel by the conventional wheel lugs, said disc being concentrically mounted with respect to the wheel and having a diameter approximately the same as the wheel, a series of fixed holders, each of which includes means forming a guide-way, mounted in radial relation on one side surface of the disc, said holders being equally circumferentially spaced thereon, an elongated member slidably arranged in the guide-way of each holder, a traction element on and arranged at right angles with respect to each member, the elements overlying the tread of the tire, and interengaging means between each member and its respective holder providing an adjustable limit for relative radial outward motion of the members and their traction elements, said means however allowing for relatively inward radial movement of the respective members so that as the periphery of the tire strikes the ground and becomes indented the traction element on each member can move relatively inwardly to accommodate the indentation of the tire, the means limiting radial outward motion of the members and traction elements comprising a rod on each member and interengaging means on each holder for its rod, said rods each being pivoted on its member, and the interengaging means on each holder including a block having a slot with undercut side portions to receive its rod with a manual snap fit.

2. The device of claim 1 wherein the free end of each rod is threaded and there being a nut on each thread for adjustment to engage the inward end of the respective block, each block, slot, and rod all being arranged radially with respect to the disc.

3. The device of claim 1 wherein the means limiting radial outward motion of the members and traction elements comprises a rod on each member and interengaging means on each holder for the rod, said rod being pivoted on its member, and the interengaging means on the holder including a block having a slot with undercut side portions to receive the rod with a manual snap fit, the free end of the rod being threaded and there being a nut on the thread for adjustment to engage the inward end of the block, the block, slot, and rod all being arranged radially with respect to the disc, and a safety device adjacent the inner end of each elongated member, each safety device comprising a snap-up dog, and a spring to move it to safety position aligned with the respective fixed holder.

References Cited by the Examiner
UNITED STATES PATENTS

| | | | |
|---|---|---|---|
| 2,463,605 | 3/49 | Devine | 152—216 |
| 2,808,094 | 10/57 | Marchionda | 152—226 |
| 3,089,528 | 5/63 | Aler | 152—216 |
| 3,093,180 | 6/63 | Jones | 152—216 |
| 3,117,612 | 1/64 | Minutilla | 152—216 |

ARTHUR L. LA POINT, *Primary Examiner.*